United States Patent [19]
Luo

[11] Patent Number: 6,160,063
[45] Date of Patent: Dec. 12, 2000

[54] IRON-BASED CATALYST FOR PRODUCING BINARY CIS-1,4-/1,2-POLYBUTADIENE

[75] Inventor: Steven Luo, Akron, Ohio

[73] Assignee: Bridgestone Corporation, Tokyo, Japan

[21] Appl. No.: 09/475,547

[22] Filed: Dec. 30, 1999

[51] Int. Cl.$^7$ ............... C08F 136/06; C08F 4/70
[52] U.S. Cl. .......... 526/139; 526/169.1; 526/335; 502/117; 502/121; 502/154; 502/155
[58] Field of Search ............... 502/117, 121, 502/154, 155; 526/139, 169.1, 335

[56] References Cited

U.S. PATENT DOCUMENTS

| | | | |
|---|---|---|---|
| 3,419,505 | 12/1968 | Marsico | 260/2 |
| 3,457,186 | 7/1969 | Marsico | 252/429 |
| 3,498,963 | 3/1970 | Ichikawa et al. | 260/94.3 |
| 3,725,373 | 4/1973 | Yoo | 260/88.7 R |
| 3,778,424 | 12/1973 | Sugiura et al. | 260/94.3 |
| 3,817,968 | 6/1974 | Furukawa et al. | 260/94.3 |
| 3,957,894 | 5/1976 | Saeki et al. | 260/666 |
| 4,048,418 | 9/1977 | Throckmorton | 526/138 |
| 4,148,983 | 4/1979 | Trockmorton | 526/139 |
| 4,168,357 | 9/1979 | Throckmorton et al. | 526/139 |
| 4,168,374 | 9/1979 | Throckmorton et al. | 526/139 |
| 4,182,813 | 1/1980 | Makino et al. | 526/92 |
| 4,230,841 | 10/1980 | Prudence | 526/179 |
| 4,340,685 | 7/1982 | Takeuchi et al. | 525/247 |
| 4,379,889 | 4/1983 | Ashitaka et al. | 525/247 |
| 4,401,800 | 8/1983 | Hall | 526/175 |
| 4,530,959 | 7/1985 | Armbruster et al. | 524/526 |
| 4,537,939 | 8/1985 | Hall et al. | 526/179 |
| 4,579,920 | 4/1986 | Tsujimoto et al. | 526/138 |
| 4,751,275 | 6/1988 | Witte et al. | 526/139 |
| 5,239,023 | 8/1993 | Hsu et al. | 526/141 |
| 5,283,294 | 2/1994 | Hsu et al. | 525/247 |
| 5,356,997 | 10/1994 | Massie, II et al. | 526/237 |
| 5,548,045 | 8/1996 | Goto et al. | 526/161 |
| 5,677,405 | 10/1997 | Goodall et al. | 526/281 |
| 5,891,963 | 4/1999 | Brookhart et al. | 525/326.1 |
| 5,919,875 | 7/1999 | Luo et al. | 526/139 |

OTHER PUBLICATIONS

English Abstract of Japanese Patent No. 48–6939.
English Abstract of Japanese Patent No. 48–64178.
*Polymer Journal*, vol. 2, pp. 371 (1971).
*Polymer Journal*, vol. 5, pp. 231 (1973).
*Journal of Molecular Catalysis*, vol. 17, pp. 65 (1982).
Syndiotactic 1,2–Polybutadiene with Co–CS$_2$ Catalyst System I. Preparation Properties and Application of JHighly Crystalline Syndiotactic 1,2–Polybutediene, II. Catalyst for Stereospecific Polymerization of Butadiene to Syndiotactic 1,2–Polybutadiene, III. $^1$H and $^{13}$C–NMR Study of Highly Syndiotactic 1,2–Polybutadiene and IV Mechanism of Syndiotactic Polymerization of Butadiene with Cobalt Compounds–Organoaluminum–CS$_2$, *Journal of Polymer Science: Polymer Chemistry Edition*, by H. Ashitaka et al., vol. 21, pp. 1853–1860 and 1951–1995, (1983).
Comprehensive Polymer Science, by Porri and Giarrusso, Pergamon Press, Oxford, vol. 4, pp. 53, (1989).
U.S. Patent application Ser. No. 08/996,656, filed on Dec. 23, 1997.
U.S. Patent application Ser. No. 09/088,611, filed on Jun. 1, 1998.
U.S. Patent application Ser. No. 09/173,956, filed on Oct. 14, 1998.
U.S. Patent application Ser. No. 09/172,305, filed on Oct. 14, 1998.
U.S. Patent application Ser. No. 09/172,346, filed on Oct. 14, 1998.
U.S. Patent application Ser. No. 09/328,549, filed on Jun. 9, 1999.
U.S. Patent application Ser. No. 09/434,669, filed on Nov. 5, 1999.
U.S. Patent application Ser. No. 09/475,723, filed on Dec. 30, 1999.
U.S. Patent application Ser. No. 09/434,627, filed on Nov. 5, 1999.
U.S. Patent application Ser. No. 09/475,343, filed on Dec. 30, 1999.
U.S. Patent application Ser. No. 09/475,345, filed on Dec. 30, 1999.
U.S. Patent application Ser. No. 09/439,861, filed on Nov. 12, 1999.

*Primary Examiner*—Fred Teskin
*Attorney, Agent, or Firm*—David G. Burleson; Arthur M. Reginelli

[57] ABSTRACT

A catalyst composition that is the combination of or the reaction product of ingredients including an iron-containing compound, an organomagnesium compound, and a cyclic hydrogen phosphite. This catalyst composition is particularly useful for polymerizing 1,3-butadiene into binary cis-1,4/1,2-polybutadiene.

20 Claims, No Drawings

IRON-BASED CATALYST FOR PRODUCING BINARY CIS-1,4-/1,2-POLYBUTADIENE

FIELD OF THE INVENTION

The present invention generally relates to a catalyst composition for use in polymerizing 1,3-butadiene into binary cis-1,4-/1,2-polybutadiene. More particularly, the present invention is directed toward an iron-based catalyst composition that is formed by combining an iron-containing compound, an organomagnesium compound, and a cyclic hydrogen phosphite.

BACKGROUND OF THE INVENTION

Binary cis-1,4-/1,2-polybutadiene is a polybutadiene rubber that has a microstructure in which the polymeric main chain consists almost exclusively of cis-1,4- and 1,2-units with almost no trans-1,4-units. Binary cis-1,4-/1,2-polybutadiene exhibits unique viscoelastic properties as compared to other synthetic rubbers. For instance, binary cis-1,4-/1,2-polybutadiene has higher green strength and higher tack than the polybutadiene having similar 1,2-linkage content that is made by anionic polymerization. Therefore, binary cis-1,4-/1,2-polybutadiene can be utilized in a variety of applications and is particularly useful as a tire rubber. It can also be blended into other synthetic rubbers and co-cured therewith.

Binary cis-1,4-/1,2-polybutadiene cannot be produced by anionic polymerization utilizing alkyllithium initiators. Only a few coordination catalyst systems based on transition metals are known for the preparation of binary cis-1,4-/1,2-polybutadiene. For example, Polymer Journal, Volume 2, page 371 (1971) discloses a process for polymerizing 1,3-butadiene into binary cis-1,4-/1,2-polybutadiene by using a catalyst system comprising cobalt tris(acetylacetonate), triethylaluminum, and water. Polymer Journal, Volume 5, page 231 (1973) discloses a process for preparing binary cis-1,4-/1,2-polybutadiene by polymerizing 1,3-butadiene in the presence of one of the four catalyst systems: (1) a catalyst system comprising dialkoxy molybdenum trichloride and trialkylaluminum, (2) a catalyst system comprising molybdenum pentachloride and triethylaluminum, (3) a catalyst system comprising dioxo molybdenum bis(acetylacetonate) and diethylaluminum chloride, and (4) a catalyst system comprising dioxo molybdenum bis(acetylacetonate), triethylaluminum, and a halogen compound such as ethylaluminum dichloride, carbon tetrabromide, t-butyl chloride, or iodine. U.S. Pat. No. 3,817,968 discloses a method of producing binary cis-1,4-/1,2-polybutadiene by polymerizing 1,3-butadiene in the presence of a catalyst system comprising dialkoxy molybdenum trichloride and trialkylaluminum, or a catalyst system comprising dioxo molybdenum bis(acetylacetonate) and dialkylaluminum chloride. Journal of Molecular Catalysis, Volume 17, page 65 (1982) discloses a process that produces binary cis-1,4-/1,2-polybutadiene by polymerizing 1,3-butadiene in the presence of a catalyst system comprising iron tris(acetylacetonate), triisobutylaluminum, and 1,10-phenanthroline. All of the aforementioned catalyst systems, however, have very low activity and therefore have no industrial utility.

Because binary cis-1,4-/1,2-polybutadiene is useful and the catalyst systems known heretofore in the art have various shortcomings, it would be advantageous to develop a new and significantly improved catalysts that have high catalytic activity and stereoselectivity for polymerizing 1,3-butadiene into binary cis-1,4-/1,2-polybutadiene.

SUMMARY OF THE INVENTION

In general, the present invention provides an iron-based catalyst composition that is the combination of or the reaction product of ingredients comprising an iron-containing compound, an organomagnesium compound, and a cyclic hydrogen phosphite.

The present invention further provides an iron-based catalyst composition formed by a process comprising the step of combining an iron-containing compound, an organomagnesium compound, and a cyclic hydrogen phosphite.

The present invention also provides a process for producing binary cis-1,4-/1,2-polybutadiene comprising the step of polymerizing 1,3-butadiene in the presence of a catalytically effective amount of a catalyst composition formed by a process comprising the step of combining an iron-containing compound, an organomagnesium compound, and a cyclic hydrogen phosphite.

The present invention also provides a cis-1,4-/1,2-polybutadiene polymer that is prepared by polymerizing 1,3-butadiene with a catalyst composition formed by a process comprising the step of combining an iron-containing compound, an organomagnesium compound, and a cyclic hydrogen phosphite.

Advantageously, the catalyst composition of the present invention has very high catalytic activity and stereoselectivity for polymerizing 1,3-butadiene into binary cis-1,4-/1,2-polybutadiene. This activity and selectivity, among other advantages, allows binary cis-1,4-/1,2-polybutadiene to be produced in very high yields with low catalyst levels after relatively short polymerization times. Significantly, the catalyst composition of this invention is iron-based, and iron compounds are generally stable, inexpensive, relatively innocuous, and readily available. Additionally, the catalyst composition of this invention has high catalytic activity in a wide variety of solvents including the environmentally-preferred nonhalogenated solvents such as aliphatic and cycloaliphatic hydrocarbons.

DETAILED DESCRIPTION OF ILLUSTRATIVE EMBODIMENTS

The present invention is directed toward a catalyst composition that can be employed to synthesize cis-1,4-/1,2-polybutadiene. It has now been found that cis-1,4-/1,2-polybutadiene can be efficiently synthesized by polymerizing 1,3-butadiene in the presence of an iron-based catalyst composition. The catalyst composition of the present invention is formed by combining (a) an iron-containing compound, (b) an organomagnesium compound, and (c) a cyclic hydrogen phosphite. In addition to the three catalyst ingredients (a), (b), and (c), other organometallic compounds or Lewis bases can be added, if desired.

Various iron-containing compounds or mixtures thereof can be employed as ingredient (a) of the catalyst composition of this invention. It is generally advantageous to employ iron-containing compounds that are soluble in hydrocarbon solvents such as aromatic hydrocarbons, aliphatic hydrocarbons, or cycloaliphatic hydrocarbons. Hydrocarbon-insoluble iron-containing compounds, however, can be suspended in the polymerization medium to form the catalytically active species, and are therefore also useful.

The iron atom in the iron-containing compounds can be in various oxidation states including but not limited to the 0, +2, +3, and +4 oxidation states. It is preferable to use divalent iron compounds (also called ferrous compounds), wherein the iron is in the +2 oxidation state, and trivalent iron compounds (also called ferric compounds), wherein the iron is in the +3 oxidation state. Suitable types of iron-containing compounds that can be utilized in the catalyst composition of this invention include, but are not limited to, iron carboxylates, iron carbamates, iron dithiocarbamates, iron xanthates, iron β-diketonates, iron alkoxides or aryloxides, iron halides, iron pseudo-halides, iron oxyhalides, and organoiron compounds.

Some specific examples of suitable iron carboxylates include iron(II) formate, iron(III) formate, iron(II) acetate, iron(III) acetate, iron(II) acrylate, iron(III) acrylate, iron(II) methacrylate, iron(III) methacrylate, iron(II) valerate, iron (III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Some specific examples of suitable iron carbamates include iron(II) dimethylcarbamate, iron(III) dimethylcarbamate, iron(II) diethylcarbamate, iron(III) diethylcarbamate, iron(II) diisopropylcarbamate, iron(III) diisopropylcarbamate, iron(II) dibutylcarbamate, iron(III) dibutylcarbamate, iron(II) dibenzylcarbamate, and iron(III) dibenzylcarbamate.

Some specific examples of suitable iron dithiocarbamates include iron(II) dimethyldithiocarbamate, iron(III) dimethyldithiocarbamate, iron(II) diethyldithiocarbamate, iron(III) diethyldithiocarbamate, iron(II) diisopropyldithiocarbamate, iron(III) diisopropyldithiocarbamate, iron(II) dibutyldithiocarbamate, iron(III) dibutyldithiocarbamate, iron(II) dibenzyldithiocarbamate, and iron(III) dibenzyldithiocarbamate.

Some specific examples of suitable iron xanthates include iron(II) methylxanthate, iron(III) methylxanthate, iron(II) ethylxanthate, iron(III) ethylxanthate, iron(II) isopropylxanthate, iron(III) isopropylxanthate, iron(II) butylxanthate, iron(III) butylxanthate, iron(II) benzylxanthate, and iron(III) benzylxanthate.

Some specific examples of suitable iron β-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron(III) benzoylacetonate, iron(II) 2,2,6, 6-tetramethyl-3,5-heptanedionate, and iron(III) 2,2,6,6-tetramethyl-3,5-heptanedionate.

Some specific examples of suitable iron alkoxides or aryloxides include iron(II) methoxide, iron(III) methoxide, iron(II) ethoxide, iron(III) ethoxide, iron(II) isopropoxide, iron(III) isopropoxide, iron(II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

Some specific examples of suitable iron halides include iron(II) fluoride, iron(III) fluoride, iron(II) chloride, iron(III) chloride, iron(II) bromide, iron(III) bromide, and iron(II) iodide. Some representative examples of suitable iron pseudo-halides include iron(II) cyanide, iron(III) cyanide, iron(II) cyanate, iron(III) cyanate, iron(II) thiocyanate, iron (III) thiocyanate, iron(II) azide, iron(III) azide, and iron(III) ferrocyanide (also called Prussian blue). Some representative examples of suitable iron oxyhalides include iron(III) oxychloride and iron(III) oxybromide.

The term "organoiron compound" refers to any iron compound containing at least one iron-carbon bond. Some specific examples of suitable organoiron compounds include bis(cyclopentadienyl)iron(II) (also called ferrocene), bis (pentamethylcyclopentadienyl)iron(II) (also called decamethylferrocene), bis(pentadienyl)iron(II), bis(2,4-dimethylpentadienyl)iron(II), bis(allyl)dicarbonyliron(II), (cyclopentadienyl)(pentadienyl)iron(II), tetra(1-norbornyl) iron(IV), (trimethylenemethane)tricarbonyliron(II), bis (butadiene)carbonyliron(0), butadienetricarbonyliron(0), and bis(cyclooctatetraene)iron(0).

Various organomagnesium compounds or mixtures thereof can be utilized as ingredient (b) of the catalyst composition of this invention. As used herein, the term "organomagnesium compound" refers to any magnesium compound that contains at least one magnesium-carbon bond. It is generally advantageous to employ organomagnesium compounds that are soluble in a hydrocarbon solvent.

A preferred class of organomagnesium compounds that can be utilized is represented by the general formula $MgR^1_2$, where each $R^1$, which may be the same or different, is a mono-valent organic group, with the proviso that the group is attached to the magnesium atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Some specific examples of suitable dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and the like, and mixtures thereof. Dibutylmagnesium is particularly useful due to its availability and its solubility in aliphatic and cycloaliphatic hydrocarbon solvents.

Another class of organomagnesium compounds that can be utilized is represented by the general formula $R^2MgX$, where $R^2$ is a mono-valent organic group, with the proviso that the group is attached to the magnesium atom via a carbon atom, and X is a hydrogen atom, a halogen atom, a carboxylate group, an alkoxide group, or an aryloxide group. Preferably, $R^2$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, X is a carboxylate group, an alkoxide group, or an aryloxide group, with each group preferably containing 1 to 20 carbon atoms.

Suitable types of organomagnesium compounds that are represented by the general formula $R^2MgX$ include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Some specific examples of suitable organomagnesium compounds that are represented by the general formula $R^2MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various cyclic hydrogen phosphites or mixtures thereof can be utilized as ingredient (c) of the catalyst composition of this invention. In general, cyclic hydrogen phosphites contain a divalent organic group that bridges between the two oxygen atoms that are singly-bonded to the phosphorus atoms. These cyclic hydrogen phosphites may be represented by the following keto-enol tautomeric structures:

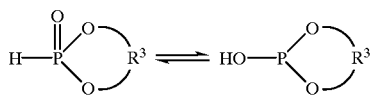

where $R^3$ is a divalent organic group. Preferably, $R^3$ is a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to 20 carbon atoms. These hydrocarbylene groups may contain heteroatoms such as, but not limited to, nitrogen, oxygen, silicon, sulfur, and phosphorus atoms. The cyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^3$ group, the type of solvent, and the like. Both tautomers may be associated in dimeric, trimeric or oligomeric forms by hydrogen bonding. Either of the two tautomers or mixtures thereof can be employed as the ingredient (c) of the catalyst composition of this invention.

The cyclic hydrogen phosphites may be synthesized by the transesterification reaction of an acyclic dihydrocarbyl hydrogen phosphite (usually dimethyl hydrogen phosphite or diethyl hydrogen phosphite) with an alkylene diol or an arylene diol. Procedures for this transesterification reaction are well known to those skilled in the art. Typically, the transesterification reaction is carried out by heating a mixture of an acyclic dihydrocarbyl hydrogen phosphite and an alkylene diol or an arylene diol. Subsequent distillation of the side-product alcohol (usually methanol or ethanol) that results from the transesterification reaction leaves the new-made cyclic hydrogen phosphite.

Some specific examples of suitable cyclic alkylene hydrogen phosphites are 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-propyl-5-ethyl-1,3,2-dioxaphosphorinane, 2-oxo-(2H) -4-methyl-1,3,2-dioxaphospholane, 2-oxo-(2H) -4,5-dimethyl-1,3,2-dioxaphospholane, 2-oxo-(2H)-4,4,5,5-tetramethyl-1,3,2-dioxaphospholane, and the like. Mixtures of the above cyclic alkylene hydrogen phosphites may also be utilized.

Some specific examples of suitable cyclic arylene hydrogen phosphites are 2-oxo-(2H) -4,5-benzo-1,3,2-dioxaphospholane, 2-oxo-(2H) -4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, 2-oxo-(2H)-4,5-naphthalo-1,3,2-dioxaphospholane, and the like. Mixtures of the above cyclic arylene hydrogen phosphites may also be utilized.

The catalyst composition of this invention has a very high catalytic activity for polymerizing 1,3-butadiene into binary cis-1,4-/1,2-polybutadiene over a wide range of total catalyst concentrations and catalyst ingredient ratios. The polymers having the most desirable properties, however, are obtained within a narrower range of catalyst concentrations and catalyst ingredient ratios. Further, it is believe that the three catalyst ingredients (a), (b), and (c) interact to form an active catalyst species. Accordingly, the optimum concentration for any one catalyst ingredient is dependent upon the concentrations of the other catalyst ingredients. The molar ratio of the organomagnesium compound to the iron-containing compound (Mg/Fe) can be varied from about 1:1 to about 100:1, more preferably from about 2:1 to about 50:1, and even more preferably from about 3:1 to about 25:1. The molar ratio of the cyclic hydrogen phosphite to the iron-containing compound (P/Fe) can be varied from about 0.5:1 to about 50:1, more preferably from about 1:1 to about 25:1, and even more preferably from about 2:1 to about 10:1.

As discussed above, the catalyst composition of the present invention is formed by combining the three catalyst ingredients (a), (b), and (c). Although an active catalyst species is believed to result from this combination, the degree of interaction or reaction between the various ingredients or components is not known with any great degree of certainty. Therefore, it should be understood that the term "catalyst composition" has been employed to encompass a simple mixture of the ingredients, a complex of the ingredients that is caused by physical or chemical forces of attraction, a chemical reaction product of the ingredients, or a combination of the foregoing.

The catalyst composition of the present invention can be formed by combining or mixing the catalyst ingredients or components by using, for example, one of the following methods:

First, the catalyst composition may be formed in situ by adding the three catalyst ingredients to a solution containing the monomer and solvent, or simply bulk monomer, in either a stepwise or simultaneous manner. When adding the catalyst ingredients in a stepwise manner, the order in which the catalyst ingredients are added is not critical. Preferably, however, the organomagnesium compound is added first, followed by the iron-containing compound, and finally followed by the cyclic hydrogen phosphite.

Second, the three catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of 1,3-butadiene monomer. That is, the three catalyst ingredients are pre-mixed in the presence of a small amount of 1,3-butadiene monomer at an appropriate temperature, which is generally from about −20° C. to about 80° C. The amount of 1,3-butadiene monomer that is used for the catalyst pre-forming can range from about 1 to about 500 moles per mole of the iron-containing compound, and preferably should be from about 4 to about 100 moles per mole of the iron-containing compound. The resulting catalyst composition is then added to the remainder of the 1,3-butadiene monomer that is to be polymerized.

Fourth, as a further variation, the catalyst composition can also be formed by using a two-stage procedure. The first stage involves combining the iron-containing compound and the organomagnesium compound in the presence of a small amount of 1,3-butadiene monomer at an appropriate temperature, which is generally from about −20° C. to about 80° C. In the second stage, the foregoing reaction mixture and the cyclic hydrogen phosphite are charged in either a stepwise or simultaneous manner to the remainder of the 1,3-butadiene monomer that is to be polymerized.

Fifth, an alternative two-stage procedure may also be employed. An iron-ligand complex is first formed by pre-combining the iron-containing compound and the cyclic hydrogen phosphite compound. Once formed, this iron-ligand complex is then combined with the organomagnesium compound to form the active catalyst species. The iron-ligand complex can be formed separately or in the presence of the 1,3-butadiene monomer that is to be polymerized. This complexation reaction can be conducted at any convenient temperature at normal pressure, but for an increased rate of reaction, it is preferred to perform this reaction at room temperature or above. The time required for the formation of the iron-ligand complex is usually within the range of about 10 minutes to about 2 hours after mixing the iron-containing compound with the hydrogen phosphite compound. The temperature and time used for the formation of the iron-ligand complex will depend upon several variables including the particular starting materials and the solvent employed. Once formed, the iron-ligand complex can be used without isolation from the complexation reaction mixture. If desired, however, the iron-ligand complex may be isolated from the complexation reaction mixture before use.

When a solution of the catalyst composition or one or more of the catalyst ingredients is prepared outside the polymerization system as set forth in the foregoing methods, an organic solvent or carrier is preferably employed. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred. The foregoing organic solvents may serve to dissolve the catalyst composition or ingredients, or the solvent may simply serve as a carrier in which the catalyst composition or ingredients may be suspended.

As described above, the catalyst composition of this invention exhibits very high catalytic activity for the polymerization of 1,3-butadiene into binary cis-1,4-/1,2-polybutadiene. Hence, the present invention further provides a process for producing binary cis-1,4-/1,2-polybutadiene by using the catalyst composition of this invention. Although the preferred embodiments of this invention are directed toward employing the catalyst composition of this invention to polymerize 1,3-butadiene into binary cis-1,4-/1,2-polybutadiene, the catalyst composition can be used to polymerize other conjugated dienes.

The production of binary cis-1,4-/1,2-polybutadiene according to this invention is accomplished by polymerizing 1,3-butadiene monomer in the presence of a catalytically effective amount of the foregoing catalyst composition. To understand what is meant by a catalytically effective amount, it should be understood that the total catalyst concentration to be employed in the polymerization mass depends on the interplay of various factors such as the purity of the ingredients, the polymerization temperature, the polymerization rate and conversion desired, and many other factors. Accordingly, specific total catalyst concentration cannot be definitively set forth except to say that catalytically effective amounts of the respective catalyst ingredients should be used. Generally, the amount of the iron-containing compound used can be varied from about 0.01 to about 2 mmol per 100 g of 1,3-butadiene monomer, with a more preferred range being from about 0.02 to about 1.0 mmol per 100 g of 1,3-butadiene monomer, and a most preferred range being from about 0.05 to about 0.5 mmol per 100 g of 1,3-butadiene monomer.

The polymerization of 1,3-butadiene according to this invention is preferably carried out in an organic solvent as the diluent. Accordingly, a solution polymerization system may be employed in which both the 1,3-butadiene monomer to be polymerized and the polymer formed are soluble in the polymerization medium. Alternatively, a precipitation polymerization system may be employed by choosing a solvent in which the polymer formed is insoluble. In both cases, an amount of the organic solvent in addition to the organic solvent that may be used in preparing the iron-based catalyst composition is usually added to the polymerization system. The additional organic solvent may be either the same as or different from the organic solvent contained in the catalyst solutions. It is normally desirable to select an organic solvent that is inert with respect to the catalyst composition employed to catalyze the polymerization. Suitable types of organic solvents that can be utilized as the diluent include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred.

The concentration of the 1,3-butadiene monomer to be polymerized is not limited to a special range. Generally, however, it is preferred that the concentration of the 1,3-butadiene monomer present in the polymerization medium at the beginning of the polymerization be in a range of from about 3% to about 80% by weight, more preferably from about 5% to about 50% by weight, and even more preferably from about 10% to about 30% by weight.

The polymerization of 1,3-butadiene according to this invention may also be carried out by means of bulk polymerization, which refers to a polymerization environment where no solvents are employed. Bulk polymerization can be conducted either in a condensed liquid phase or in a gas phase.

In performing the polymerization of 1,3-butadiene according to this invention, a molecular weight regulator may be employed to control the molecular weight of the binary cis-1,4-/1,2-polybutadiene to be produced. As a result, the scope of the polymerization system can be expanded in such a manner that it can be used for the production of binary cis-1,4-/1,2-polybutadiene having a wide range of molecular weights. Suitable types of molecular weight regulators that can be utilized include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene and vinylacetylene; and mixtures thereof. The amount of the molecular weight regulator used, expressed in parts per hundred parts by weight of the 1,3-butadiene monomer (phm), is from about 0.01 to about 10 phm, preferably from about 0.02 to about 2 phm, and more preferably from about 0.05 to about 1 phm.

The molecular weight of the binary cis-1,4-/1,2-polybutadiene to be produced can also be effectively controlled by conducting the polymerization of 1,3-butadiene monomer in the presence of hydrogen gas. In this case, the partial pressure of hydrogen gas is preferably from about 0.01 to about 50 atmospheres.

The polymerization of 1,3-butadiene according to this invention may be carried out as a batch process, a continuous process, or a semi-continuous process. In the semi-continuous process, 1,3-butadiene monomer is intermittently charged as needed to replace that monomer already polymerized. In any case, the polymerization is desirably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by the addition of a polymerization terminator that inactivates the catalyst. Typically, the terminator employed to inactivate the catalyst is a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the terminator. The amount of the antioxidant employed is usually in the range of 0.2% to 1% by weight of the polymer product. When the polymerization has been stopped, the binary cis-1,4-/1,2-polybutadiene can be recovered from the polymerization mixture by utilizing conventional procedures of desolventization and drying. For instance, the binary cis-1,4-/1,2-polybutadiene may be isolated from the polymerization mixture by coagulation of the polymerization mixture with an alcohol such as methanol, ethanol, or isopropanol, or by steam distillation of the solvent and the unreacted 1,3-butadiene monomer, followed by filtration. The product is then dried to remove residual amounts of solvent and water.

The binary cis-1,4/1,2-polybutadiene synthesized according to this invention advantageously has a trans-1,4 content that is less than about 5 percent, preferably less than 3 percent, and even more preferably less than 2 percent. Advantageously, the catalyst composition of this invention can be manipulated to vary the characteristics of the resulting binary cis-1,4-/1,2-polybutadiene. For example, the microstructure of the binary cis-1,4-/1,2-polybutadiene made utilizing the catalyst composition of this invention can be varied by changing the catalyst ingredients and the ingredient ratios. As a general rule, as the molar ratio of the organomagnesium compound to the iron-containing compound is increased, the 1,2-linkage content of the resulting binary cis-1,4-/1,2-polybutadiene increases, accompanied by a decrease in the cis-1,4-linkage content. By selecting the proper catalyst ingredients and the ingredient ratios, the catalyst composition of this invention can be utilized to prepare equibinary cis-1,4-/1,2-polybutadiene that generally consists of about equal amounts of cis-1,4- and 1,2-units with almost no trans-1,4-units. Namely, for purposes of this specification, the term equibinary cis-1,4-/1,2-polybutadiene refers to a microstructure that includes from about 45 to about 55 percent cis-1,4 units, from about 55 to about 45 percent 1,2 units, and less than about 5 percent trans-1,4 units.

The binary cis-1,4-/1,2-polybutadiene produced with the catalyst composition of this invention has higher green strength and higher tack than the polybutadiene having similar 1,2-linkage content that is made by anionic polymerization utilizing alkyllithium initiators. The binary cis-1,4-/1,2-polybutadiene has many applications and is particularly useful as atire rubber. The binary cis-1,4-/1,2-polybutadiene can also be blended into other synthetic rubbers and co-cured therewith. Vulcanized rubber compositions obtained from the binary cis-1,4-/1,2-polybutadiene of this invention have good resilience and high abrasion resistance without losing wet-skid resistance.

In order to demonstrate the practice of the present invention, the following examples have been prepared and tested as described in the General Experimentation Section disclosed hereinbelow. The examples should not, however, be construed as limiting the scope of the invention. The claims will serve to define the invention.

GENERAL EXPERIMENTATION

EXAMPLE 1

In this experiment, a cyclic hydrogen phosphite was synthesized by the transesterification reaction of an acyclic dihydrocarbyl hydrogen phosphite with an alkylene diol.

Dimethyl hydrogen phosphite (76.3 g, 0.693 mol) and 2-butyl-2-ethyl-1,3-propanediol (110.0 g, 0.687 mol) were mixed in a round-bottom reaction flask that was connected to a distillation head and a receiving flask. The reaction flask was kept under an atmosphere of argon and placed in a silicone oil bath maintained at 150° C. The transesterification reaction proceeded as indicated by the distillation of methanol. After about 2 hours of heating at the above temperature, the remaining methanol and any unreacted starting materials were removed by vacuum distillation at 135° C. and a pressure of 150 torr. The remaining crude product was distilled at 160° C. and a pressure of 2 torr, yielding 2-oxo-(2H)-5-butyl-5-ethyl-1,3,2-dioxaphosphorinane as a very viscous, colorless liquid (128.8 g, 0.625 mol, 91% yield). The proper identity of the product was established by nuclear magnetic resonance (NMR) spectroscopic analyses. $^1$H NMR data (CDCl$_3$, 25° C., referenced to tetramethylsilane): δ 6.88 (doublet, $^1J_{HP}$=675 Hz, 1H, H-P), 4.1 (complex, 4H, OCH$_2$), 0.8–1.8 (complex, 14H, Et and Bu). $^{13}$P NMR data (CDCl$_3$, 25° C., referenced to external 85% H$_3$PO$_4$): δ 3.88 (doublet of multiplets, $^1J_{HP}$=670 Hz).

EXAMPLE 2

An oven-dried 1-liter glass bottle was capped with a self-sealing rubber liner and a perforated metal cap. After the bottle was thoroughly purged with a stream of dry nitrogen gas, the bottle was charged with 227 g of a 1,3-butadiene/hexanes blend containing 22.0% by weight of 1,3-butadiene. The following catalyst components were added to the bottle in the following order: (1) 0.60 mmol of dibutylmagnesium, (2) 0.15 mmol of iron(III) acetylacetonate, and (3) 0.45 mmol of 2-oxo-(2H)-5-butyl-5-ethyl-1,3,2-dioxaphosphorinane. The bottle was tumbled for 4 hours in a water bath maintained at 65° C. The polymerization was terminated by addition of 10 mL of isopropanol containing 1.0 g of 2,6-di-tert-butyl-4-methylphenol. The polymerization mixture was coagulated with 3 liters of isopropanol. The resulting binary cis-1,4-/1,2-polybutadiene was isolated by filtration and dried to a constant weight under vacuum at 60° C. The yield of the polymer was 48.8 g (98% yield). As measured by differential scanning calorimetry (DSC), the polymer had a glass transition temperature of −63° C. and had no melting temperature. The infrared spectroscopic analysis of the polymer indicated a cis-1,4-linkage content of 52.5%, a 1,2-linkage content of 44.5%, and a trans-1,4-linkage content of 3.0%. As determined by gel permeation chromatography (GPC), the polymer had a weight average molecular weight (M$_W$) of 236,000, a number average molecular weight (M$_N$) of 112,000, and a polydispersity index (M$_W$/M$_N$) of 2.1. The monomer charge, the amounts of the catalyst ingredients, and the properties of the resulting binary cis-1,4-/1,2-polybutadiene are summarized in Table I.

TABLE I

| Example No. | 2 | 3 | 4 | 5 |
|---|---|---|---|---|
| 22.0% 1,3-Bd/hexanes (g) | 227 | 227 | 227 | 227 |
| MgBu$_2$ (mmol) | 0.60 | 0.75 | 0.90 | 1.05 |
| Fe(acac)$_3$ (mmol) | 0.15 | 0.15 | 0.15 | 0.15 |
| Cyclic hydrogen phosphite* (mmol) | 0.45 | 0.45 | 0.45 | 0.45 |
| Fe/Mg/P molar ratio | 1:4:3 | 1:5:3 | 1:6:3 | 1:7:3 |
| Polymer yield (%) after 4 hr at 65° C. | 98 | 98 | 97 | 92 |
| Glass transition temperature (° C.) | −63 | −62 | −62 | −63 |
| Polymer microstructure: | | | | |
| cis-1,4-linkage content (%) | 52.5 | 49.0 | 46.9 | 45.3 |
| 1,2-linkage content (%) | 44.5 | 48.2 | 50.6 | 52.9 |
| trans-1,4-linkage content (%) | 3.0 | 2.8 | 2.5 | 1.8 |
| M$_w$ | 236,000 | 267,000 | 238,000 | 274,000 |
| M$_n$ | 112,000 | 113,000 | 111,000 | 99,000 |
| M$_w$/M$_n$ | 2.1 | 2.4 | 2.1 | 2.8 |

*The cyclic hydrogen phosphite used was 2-oxo-(2H)-5-butyl-5-ethyl-1,3,2-dioxaphosphorinane.

EXAMPLES 3–5

In Examples 3–5, the procedure described in Example 2 was repeated except that the catalyst ingredient ratio was varied as shown in Table I. The monomer charge, the amounts of the catalyst ingredients, and the properties of the binary cis-1,4-/1,2-polybutadiene produced in each example are summarized in Table I.

As can be seen in Table I, as the molar ratio of the organomagnesium compound to the iron-containing compound is increased, the 1,2-linkage content of the resulting binary cis-1,4-/1,2-polybutadiene increases, accompanied by a decrease in the cis-1,4-linkage content.

Various modifications and alterations that do not depart from the scope and spirit of this invention will become apparent to those skilled in the art. This invention is not to be duly limited to the illustrative embodiments set forth herein.

What is claimed is:

1. A catalyst composition that is the combination of or the reaction product of ingredients comprising:

(a) an iron-containing compound;

(b) an organomagnesium compound; and (c) a cyclic hydrogen phosphite.

2. The catalyst composition of claim 1, where the iron atom in the iron-containing compound has an oxidation state of 0, +2, +3, or +4.

3. The catalyst composition of claim 1, where the iron-containing compound is an iron carboxylate, iron carbamate, iron dithiocarbamate, iron xanthate, iron β-diketonate, iron alkoxide, iron aryloxide, iron halide, iron pseudo-halide, iron oxyhalide, organoiron compound, or a mixture thereof.

4. The catalyst composition of claim 1, where the organomagnesium compound is represented by the general formula MgR$^1$$_2$, where each R$^1$, which may be the same or different, is a mono-valent organic group.

5. The catalyst composition of claim 4, where each R$^1$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, with each group containing up to about 20 carbon atoms.

6. The catalyst composition of claim 1, where the organomagnesium compound is represented by the general formula R$^2$MgX, where R$^2$ is a mono-valent organic group, and X is a hydrogen atom, a halogen atom, a carboxylate group, an alkoxide group, or an aryloxide group.

7. The catalyst composition of claim 6, where R$^2$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, with each group containing up to about 20 carbon atoms.

8. The catalyst composition of claim 1, where the cyclic hydrogen phosphite is defined by the following keto-enol tautomeric structures:

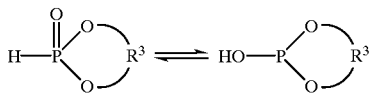

where $R^3$ is a divalent organic group.

9. The catalyst composition of claim 8, where $R^3$ is an alkylene, cycloalkylene, substituted alkylene, substituted cycloalkylene, alkenylene, cycloalkenylene, substituted alkenylene, substituted cycloalkenylene, arylene, or substituted arylene group.

10. The catalyst composition of claim 1, where the molar ratio of the organomagnesium compound to the iron-containing compound is from about 1:1 to about 100:1 and the molar ratio of the cyclic hydrogen phosphite to the iron-containing compound is from about 0.5:1 to about 50:1.

11. The catalyst composition of claim 9, where the molar ratio of the organomagnesium compound to the iron-containing compound is from about 2:1 to about 50:1, and the molar ratio of the hydrogen phosphite to the iron-containing compound is from about 1:1 to about 25:1.

12. A catalyst composition formed by a process comprising the step of combining:

(a) an iron-containing compound;

(b) an organomagnesium compound; and (c) a cyclic hydrogen phosphite.

13. A process for preparing binary cis-1,4-/1,2-polybutadiene comprising the step of:

polymerizing 1,3-butadiene in the presence of a catalytically effective amount of a catalyst composition formed by combining:

(a) an iron-containing compound;

(b) an organomagnesium compound; and (c) a cyclic hydrogen phosphite.

14. The process of claim 13, where the iron-containing compound is an iron carboxylate, iron carbamate, iron dithiocarbamate, iron xanthate, iron β-diketonate, iron alkoxide, iron aryloxide, iron halide, iron pseudo-halide, iron oxyhalide, organoiron compound, or a mixture thereof.

15. The process of claim 13, where the organomagnesium compound is represented by the general formula $MgR^1_2$, where each $R^1$, which may be the same or different, is a mono-valent organic group.

16. The process of claim 13, where the organomagnesium compound is represented by the general formula $R^2MgX$, where $R^2$ is a mono-valent organic group, and X is a hydrogen atom, a halogen atom, a carboxylate group, an alkoxide group, or an aryloxide group.

17. The process of claim 13, where the cyclic hydrogen phosphite is defined by the following keto-enol tautomeric structures:

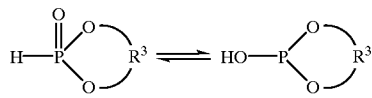

where $R^3$ is a divalent organic group.

18. The process of claim 13, where said step of polymerizing 1,3-butadiene is conducted in the presence of from about 0.01 to about 2 mmol of the iron-containing compound per 100 g of 1,3-butadiene.

19. The process of claim 13, where said step of polymerizing 1,3-butadiene is conducted in the presence of a molecular weight regulator.

20. The process of claim 13, where the molar ratio of the organomagnesium compound to the iron-containing compound is from about 1:1 to about 100:1 and the molar ratio of the cyclic hydrogen phosphite to the iron-containing compound is from about 0.5:1 to about 50:1.

* * * * *